Nov. 23, 1926.
W. H. POTTER
1,607,846
SAUSAGE MAKING MACHINE
Filed April 3, 1925   2 Sheets-Sheet 1
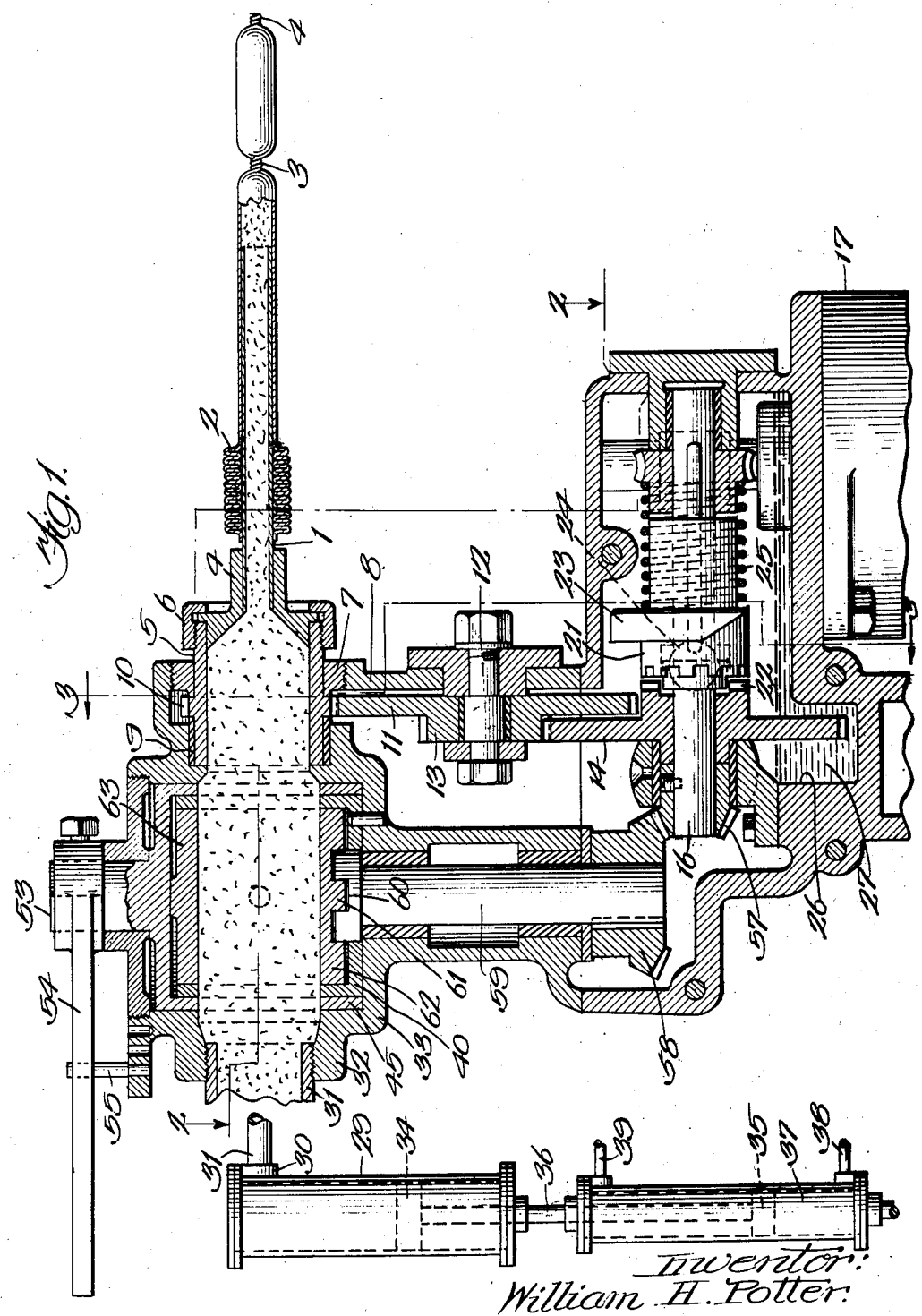
Inventor:
William H. Potter Nov. 23, 1926.
W. H. POTTER
1,607,846
SAUSAGE MAKING MACHINE
Filed April 3, 1925   2 Sheets-Sheet 2
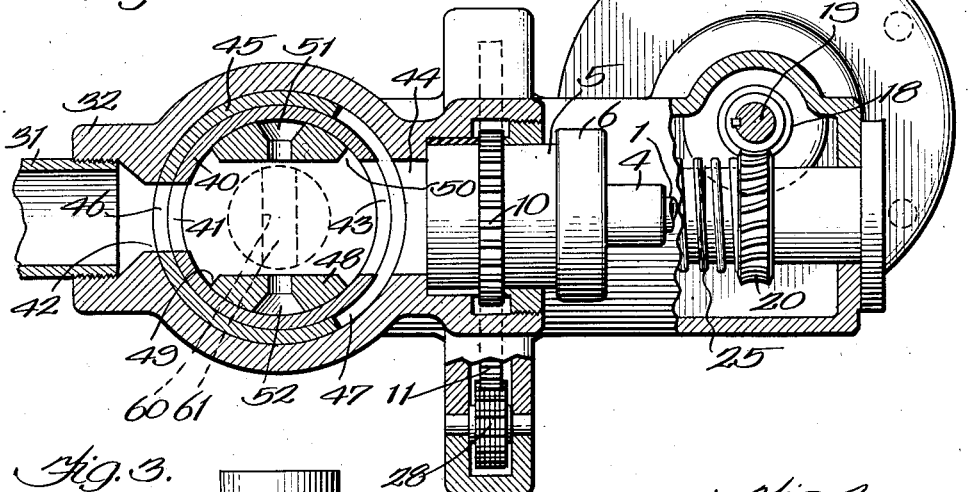
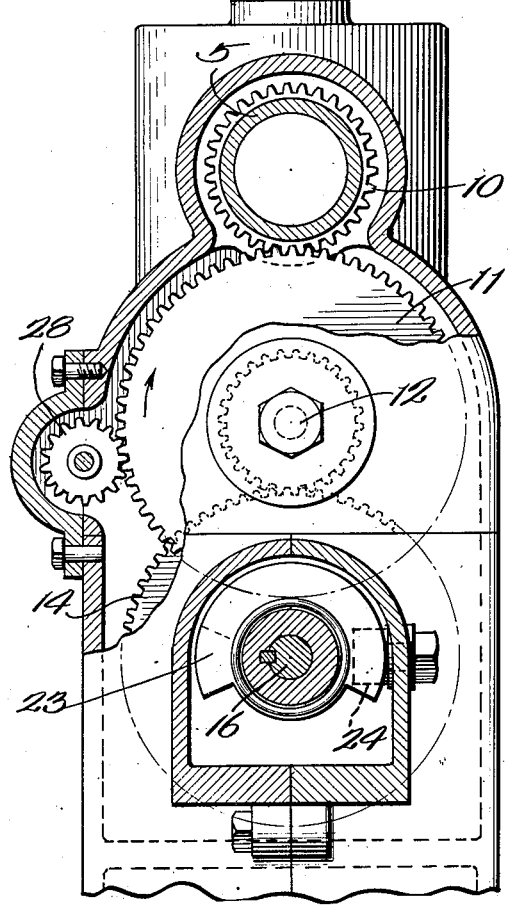
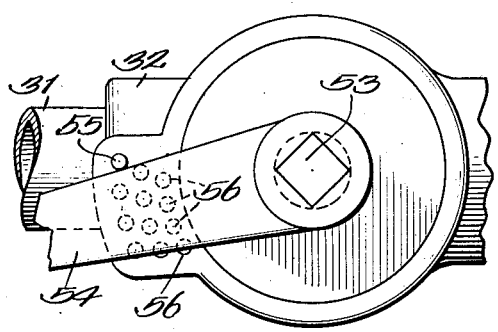
Inventor:
William H. Potter
By G. L. Cragg  Atty.

Patented Nov. 23, 1926.

1,607,846

UNITED STATES PATENT OFFICE.

WILLIAM H. POTTER, OF CHICAGO, ILLINOIS.

SAUSAGE-MAKING MACHINE.

Application filed April 3, 1925. Serial No. 20,433.

My invention relates to sausage making machines and has for one of its objects the provision of means for so regulating the flow of sausage meat into sausage casings that the casings, when filled, will not burst or become unduly distended when or just after being twisted or otherwise formed into links. In carrying out this object of my invention I do not discontinue the flow of meat while the sausage is being contracted to form it into links but merely then reduce the rate of flow sufficiently to permit of the link forming operation but only to an extent which makes the increase from the minimum to maximum flow insufficient to injure the sausage.

My invention has for another object the provision of means for lubricating sausage making machines which will prevent lubricant from being elevated to the level of the sausage so copiously as to have a surplus in the region of the sausage that would be apt to flow upon and injure the same.

I will explain my invention more fully by reference to the accompanying drawings in which Fig. 1 is a vertical sectional view of a sausage making machine constructed in accordance with the preferred embodiment of my invention; Fig. 2 is a sectional view on line 2—2 of Fig. 1; Fig. 3 is a sectional view on line 3—3 of Fig. 1; Fig. 4 is a plan view showing a detail of construction; and Fig. 5 is a view showing changed positions of some of the parts shown in Fig. 2.

The spindle 1 is hollow to permit passage of sausage meat through its bore into the sausage casing 2 slipped upon the spindle, this casing being shown accumulated in crumpled form at its left end. The casing is twisted or otherwise contracted at intervals 3, 4 etc. to form the sausage into links. The twist immediately adjacent the discharge end of the spindle constitutes an abutment against which the meat presses as it issues through the spindle to pull or assist in pulling the casing from the spindle as the sausage is forming. Hitherto the flow of meat through the spindle was cut off during the formation of the twists and was resumed upon the completion of the twists. When the flow of meat was resumed the impact of the meat (suddenly flowing in full volume), against the twisted portion of the casing adjacent the spindle was sufficient to frequently burst or injuriously distend the casing. In accordance with my invention, the flow of meat does not cease during the twisting operation, but is merely reduced to a point that will permit the twisting but not to a point from which the increase to the normal flow would harm the sausage.

The twisting is desirably accomplished by turning the hollow spindle 1 which thus becomes a hollow mandrel. This mandrel is turned preferably only when the twisting is to occur, the sausage at a point just ahead of the intended location of the twist being held by an operative or otherwise while the mandrel turns. The mandrel is secured to a head 4 which is clamped into assembly with a rotatable sleeve 5 by a shouldered clamping nut 6. The meat passes through the spindle through this head, as will appear. The sleeve 5 turns in a sleeve 7 carried by and screwed to the frame 8 of the machine. The sleeve 5 also turns in another sleeve 9 that is aligned with sleeve 7 and is also carried by the frame of the machine. A spur gear 10 is provided upon the extension of the sleeve 5 and is coaxial therewith. Another spur gear 11 meshes with gear 10 and is journaled upon the shaft 12. The spur gear 11 carries a spur pinion 13 in fixed relation thereto and coaxial therewith. A spur gear 14 is in mesh with pinion 13. Gear 14 is intermittently turned to intermittently turn the sleeve 5 and mandrel 1 through the other gears mentioned, this operation occurring each time the sausage is to be twisted. The means for intermittently turning the gear 14 illustrated resides in the shaft 16 upon which this gear is journaled, a motor 17 (which constantly turns the shaft through the intermediation of the worm 18 upon the motor shaft 19, and the worm wheel 20 fixed on shaft 16), the clutch member 21 splined on shaft 16, and the clutch member 22 fixed upon gear 14 and complemental to clutch member 21. A cam 23 is in fixed relation to clutch member 21. A stationary cam roller 24 cooperates with the cam to disengage clutch member 21 from clutch member 22. When the cam is turned out of engagement with the cam roller, spring 25 presses the clutch member 21 into engagement with clutch member 22 whereupon the mandrel 1 is turned, for the purpose stated, through the intermediation of the described gearing between the clutch member 22 and said mandrel.

The frame of the machine is formed with a lubricant basin 26, the lower part of gear 14 dipping into the oil 27 that is in the basin. The lubricant is conveyed upwardly by gear 14 and some of it is conveyed to pinion 13, gear 11 and gear 10. The lubricant finds its way from these various gear elements to neighboring bearing parts and to the meshing gear teeth. Surplus lubricant is removed from gear 11 by the series of toothed disks 28 meshing therewith. These disks are slightly spaced apart to enable the removed surplus lubricant to pass downwardly therebetween, this surplus lubricant finding its way back to the basin 26. In this way surplus lubricant is prevented from rising to the level of the spindle 1 which is above the gears 11, 13 and 14. This surplus lubricant is thus prevented from reaching the sausage meat that is flowing to the mandrel.

Any suitable means may be employed for effecting the flow of the meat. Such means is shown in Fig. 1 at the left thereof and on a much smaller scale than the balance of Fig. 1, due to lack of space. The illustrated means is inclusive of a large feeding cylinder 29 having a lateral outlet 30 at its upper end into which one end of a discharge pipe 31 is screwed, the other end of this discharge pipe being screwed within a boss 32 that is carried upon a side of the valve casing 33, the outlet 30, the pipe 31 and the boss 32 being aligned with the passage in the valve casing. A piston plunger 34 is moved upwardly in the cylinder 29 by some suitable agency, preferably by means of another piston 35 coupled therewith by means of a rod 36 and moving within a cylinder 37 into which air is admitted under sufficient pressure through the pipe 38 to force the pistons upwardly, the air above the piston 35 being displaced through the pipe 39. To lower the piston, the flow of air under pressure is reverse through pipes 38 and 39. The means for forcing the meat from the cylinder 29 is thus yielding to avoid breakage or undue jamming.

The valve casing 33 has diametrically opposite horizontally aligned parts 42, 44 that are aligned with the pipe 31, the sleeve 5, the outlet bore in head 4 and the mandrel 1. The interior of the valve casing 33 is cylindrical, its axis being upright. A stationary cylindrical valve casing 40 is disposed within and is coaxial with the cylindrical interior of valve casing 33 and is spaced apart from the casing 33 to define an annular space. The cylindrical valve casing 40 has an inlet port 41 of the same size as and in fixed alignment with the inlet port 42 in the valve casing 33. Valve casing 40 has an outlet port 43 which is in fixed alignment with the discharge port 44 in valve casing 33.

A valve 45 of cylindrical form is snugly received in the annular space between the stationary valve casings 33 and 40. This valve 45 has diametrically and horizontally aligned ports 46, 47 that are in the zone of the ports 41, 42, 43 and 44. Port 46 is adapted to be brought into full alignment with ports 41, 42, 43 and 44. Port 47 is as large as the other ports in all directions and is laterally and horizontally enlarged in both directions with respect to the other ports. A valve 48 turns in the cylindrical valve casing 40. Valve 48 has diametrically opposite and horizontally aligned main ports 49 and 50 disposed in the zone of the other ports. Valve 48 has two minor ports 51 tnd 52 that are diametrically opposite and in the zone of the other ports, these ports being together at right angles to the ports 49 and 50.

Valve 45 is normally fixed but may be turned to any selected fixed position to reduce the amount of meat admitted through the port 42 to adapt the machine to the size of the sausage to be produced. To this end the valve 45 is desirably in the form of an inverted cup having an upper stem 53 upon which an arm 54 is fixed. This arm is brought to rest against a pin 55 that is receivable in any of the holes 56 which are located according to the various meat flow adjusting positions for which the machine is designed.

The valve 48 is constantly rotated upon its upright axis by the shaft 16 operating through the bevel gear 57 upon shaft 16, the bevel gear 58 meshing with gear 57 and fixed upon the lower end of upright shaft 59, the mortise 60 upon the upper end of shaft 59, and the tenon 61 upon the bottom wall 62 of valve 48, this valve also having a top wall 63, these bottom and top walls of this valve merging with the upright walls of the valve to define a passage for the flow of meat through the valve which is thus only adapted for the passage of meat at its ports 49, 50, 51 and 52. The ports 49 and 50 are horizontally elongated to be horizontally longer than the ports 42, 46, 41, and 43, whereby valve 48 may turn through a large arc without diminishing the maximum flow of meat which is determined by the position in which the valve 45 is fixed. Where the flow of meat is undiminished by the valve 48, the mandrel 1 is at rest. When valve 48 reduces the flow of meat, mandrel 1 is turned in order that the sausage casing may be twisted just in front of the mandrel to form a new sausage link. The smaller ports 51 and 52 are brought into register with the fixed ports 42, 46, 43 and 47 before the ports 49 and 50 have been brought out of register with the ports 42, 46, 43 and 47 to an extent to reduce the capacity of ports 49 and 50 below the capacity of ports 51 and 52, whereby the quantity of meat flowing through the valve 48 is never reduced beyond the quantity which ports 51 and 52 will carry. When the valve 48 is passing the minimum quantity of meat defined by ports 51 and 52 the mandrel 1 is turned and the twisting of the sausage casing occurs. When the twisting of the sausage casing ceases, the flow of meat gradually increases as the valve 48 is turned to cause its ports 51 and 52 to be gradually closed by the interior fixed valve chamber 40 and the ports 49 and 50 to be gradually opened.

By means of the valving mechanism described, the flow of meat never ceases, but is reduced sufficiently at intervals to permit the twisting of the casing and is thereafter increased to its predetermined maximum flow, the increase in the flow of the meat from minimum to maximum not being sufficient to injure the sausage.

Changes may be made without departing from my invention.

Having thus described my invention I claim:

1. A sausage making machine including a hollow spindle for receiving a sausage casing thereon; means for effecting the continuous flow of meat through said spindle and into the sausage casing; and means for reducing the flow of meat through said spindle at intervals to permit the sausage to be contracted at intervals to form the sausage into links.

2. A sausage making machine including a hollow spindle for receiving a sausage casing thereon; means for effecting the continuous flow of meat through said spindle and into the sausage casing; means for reducing the flow of meat through said spindle at intervals to permit the sausage to be contracted at intervals to form the sausage into links; and means operating concurrently with the aforesaid means for contracting the sausage at intervals to form the sausage into links.

3. A sausage making machine including a hollow mandrel for receiving a sausage casing thereon; means for effecting the continuous flow of meat through said mandrel and into the sausage casing; means for reducing the flow of meat through said mandrel at intervals; and means for turning the mandrel at intervals to twist the sausage at intervals into links and operating concurrently with the aforesaid means.

4. A sausage making machine including a hollow spindle for receiving a sausage casing thereon; means for effecting the continuous flow of meat through said spindle and into the sausage casing; and valving mechanism permitting flow of meat and reducing the flow of meat through said spindle at intervals to permit the sausage to be contracted at intervals to form the sausage into links.

5. A sausage making machine including a hollow spindle for receiving a sausage casing thereon; means for effecting the continuous flow of meat through said spindle and into the sausage casing; means for reducing the flow of meat through said spindle at intervals to permit the sausage to be contracted at intervals to form the sausage into links; and means operating concurrently with the latter means when reducing the flow of meat for contracting the sausage at intervals to form the sausage into links.

6. A sausage making machine including a hollow mandrel for receiving a sausage casing thereon; means for effecting the continuous flow of meat through said mandrel and into the sausage casing; valving mechanism permitting maximum flow of meat and reducing the flow of meat through said mandrel at intervals; and means for turning the mandrel at intervals to twist the sausage at intervals into links and operating concurrently with the aforesaid valving mechanism when reducing the flow of meat.

7. A sausage making machine including a hollow spindle for receiving a sausage casing thereon; means for effecting the continuous flow of meat through said spindle and into the sausage casing; and valving mechanism having a main port permitting maximum flow of meat and a minor port reducing the flow of meat through said spindle at intervals to permit the sausage to be contracted at intervals to form the sausage into links.

8. A sausage making machine including a hollow mandrel for receiving a sausage casing thereon; means for effecting the continuous flow of meat through said mandrel and into the sausage casing; valving mechanism having a main port permitting maximum flow of meat and a minor port reducing the flow of meat through said mandrel at intervals; and means for turning the mandrel at intervals to twist the sausage at intervals into links and operating concurrently with the aforesaid valving mechanism when reducing the flow of meat.

9. A sausage making machine including a hollow spindle for receiving a sausage casing thereon; means for effecting the continuous flow of meat through said spindle and into the sausage casing; means for reducing the flow of meat through said spindle at intervals to permit the sausage to be contracted at intervals to form the sausage into links; and means operating concurrently with the latter means when reducing the flow of meat for twisting the sausage at intervals to form the sausage into links.

In witness whereof, I hereunto subscribe my name.

WILLIAM H. POTTER.